United States Patent Office 3,453,325
Patented July 1, 1969

3,453,325
PREPARATION OF ACYL HALIDES
Friedrich Asinger, Aachen, Germany, assignor to Ethyl Corporation, New York, N.Y., a corporation of Virginia
No Drawing. Filed Dec. 22, 1966, Ser. No. 603,748
Int. Cl. C07c 51/58, 53/14; C01f 7/48
U.S. Cl. 260—544    4 Claims

ABSTRACT OF THE DISCLOSURE

Acyl halide-aluminum halide complexes are broken by reacting them with sulfur dioxide. The product is a mixture of free acyl halide and an aluminum halide-sulfur dioxide complex. The aluminum halide can be recovered from the latter complex, for example, by heating at mild temperatures and under reduced pressure.

BACKGROUND OF THE INVENTION

This invention relates to a method for breaking a complex formed by an acyl halide and an aluminum halide. Succinctly, the method of this invention comprises reacting said complex with sulfur dioxide. In a preferred embodiment, the resultant complex between the aluminum halide and sulfur dioxide is treated to recover free aluminum halide.

Acyl halides are known to complex with aluminum halides such as aluminum chloride. Such complexes are formed when an acyl halide is produced by a process employing an aluminum halide catalyst. To applicant's knowledge, there is no published art describing a satisfactory method for disrupting these complexes to yield substantially anhydrous aluminum halide. It is known that complexes between acyl halides and aluminum halides can be broken by treating with water. However this method is not satisfactory since aluminum chloride is not recovered, but rather, aluminum hydroxide or $AlCl_3 \cdot 6H_2O$ is produced.

SUMMARY OF THE INVENTION

This invention provides a process for the isolation of an acyl halide which process comprises reacting sulfur dioxide with an acyl halide-aluminum chloride complex. The product of this process is the free acyl halide and a resultant complex between said aluminum halide and sulfur dioxide. This invention also comprises a method whereby said resultant complex is treated to form free aluminum halide which can be recycled. Because the aluminum halide can be recycled, this invention provides an economic route for the preparation of acyl halides. In a most preferred embodiment, the starting material for the processes of this invention is the complex between β-chloroisobutyrylchloride and aluminum chloride. β-Chloroisobutyryl chloride is a valuable intermediate. By treatment with methanol and subsequent dehydrohalogenation, it yields methyl methacrylate—a valuable monomer. Similarly, many of the other compounds produced by this invention are known, and they have the many utilities described for them.

DESCRIPTION OF THE PREFERRED EMBODIMENTS (a) Disruption of acyl halide-aluminum halide complexes The complexes used as starting materials in this process contain one mole of acyl halide. Thus, the complex can be represented by

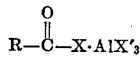

wherein R is an alkyl radical and X and X' are halogens which may be alike or different. The alkyl radical may be substituted with a halogen atom. When so substituted it is preferred that this halogen atom be in the beta position. The number of carbon atoms in the radical R is not critical; hence, R can contain up to 10 or more carbon atoms. Preferably, R is a lower alkyl radical having up to about six carbon atoms.

The process of this invention is operable when two or more types of halogen are present in the complex molecule. Preferably, all halogen atoms are the same and selected from chlorine and bromine.

In a most preferred embodiment, R is a chloro substituted isopropyl radical and X and X' are chlorine. In other words, a most preferred embodiment of this invention comprises disruption of the complex formed between β-chloroisobutyryl chloride and aluminum chloride.

To form free acyl halides according to this invention, the complexes described above are reacted with a sulfur dioxide. The sulfur dioxide may be either in the liquid or gaseous state. It has been found that liquid sulfur dioxide can be effectively employed and the use of the liquid material constitutes a preferred embodiment of this invention.

Best results are achieved if at least one mole of sulfur dioxide is used per each mole of acyl halide-aluminum halide complex. A stoichiometric excess of sulfur dioxide is preferred in many instances since such an excess tends to drive the reaction to completion. There are no real upper limits on the amount of sulfur dioxide employed. However, for practical reasons, it is preferred that the excess be quite small, less than about 10 moles per mole of complex.

The temperature at which this process is carried out is not critical. However, it is usually desirable for the reaction to be conducted in the liquid state. Temperatures within the range of from about 0° to about 100° C. can be employed. A preferred temperature range is from about −30° to about 45° C. Ambient temperatures are quite useful in many instances.

A solvent is not necessary for this process but one can be used if desired. Any organic solvent which is non-reactive toward the reactants and products can be employed. Typical applicable solvents are methylene chloride, carbon tetrachloride, 1,1,1-trichloroethane, and other halogenated compounds.

The reaction pressure used when treated with acyl halide-aluminum chloride complex with sulfur dioxide is not critical.

Ambient pressures are preferred. However subatmospheric and superatmospheric pressures can be used, if desired. The reaction time is not a truly independent variable; it depends somewhat on the reaction temperature, concentration of reactants, etc. Short reaction times are adequate, that is, times from about one minute to about two days.

(b) Recovery of aluminum halide

As stated above, the complex between sulfur dioxide and aluminum halide (which is produced upon reacting sulfur dioxide with the aluminum halide-acyl halide complex) can be treated to recover free aluminum halide. In a preferred embodiment, this is carried out by heating the resultant complex to a temperature within the range of 30–120° C. and at a pressure within the range of 1–500 torrs. If desired, the material remaining after the heating step can be treated with a solvent in which aluminum chloride is insoluble, for example, carbon tetrachloride or methylene chloride. Upon so treating the heated material, the aluminum chloride will separate since it is insoluble in these solvents.

The following examples serve to illustrate this invention but do not limit it. In the examples, all parts are by weight.

EXAMPLE 1

The aluminum chloride-β-chloroisobutyryl chloride complex employed in this procedure was prepared by carbonylation of 1,2-dichloropropane according to the method of application Ser. No. 559,398, filed June 22, 1966.

About 22 parts of methylene chloride solution containing the complex was evaporated at room temperature to yield a viscous red-brown oil. About 4.5 parts of liquid sulfur dioxide was condensed into the reaction vessel. (The mole ratio of sulfur dioxide to complex was about 3 to 1.)

Excess sulfur dioxide was evaporated from the reaction mixture and a somewhat less viscous oil was obtained. This material was extracted with three 11.3 part and three 5.65 part fractions of n-heptane. The extracts were combined and treated with 2.3 parts of methanol.

The filtrate produced after removal of solid was found to contain 0.64 part of methyl β-chloroisobutyrate. Similar results are obtained using carbon tetrachloride as the solvent and using reaction temperatures from −30° to 45° C.

The use of methanol in the above procedure to prepare the corresponding ester of β-chlorisobutyric acid is not a critical step in this invention. However, it demonstrates the use of acyl halides produced by the process of this invention as chemical intermediates.

EXAMPLE 2

To demonstrate the feasibility of recovering aluminum halide from an aluminum halide-sulfur dioxide complex, the following experiment was carried out.

A mixture of 1.94 parts of aluminum chloride, 5.65 parts of methylene chloride and 2.1 parts of liquid $SO_2$ was prepared. Evaporation of the methylene chloride at room temperature and at reduced pressure yielded a tan, partially solidified residue which was completely soluble in methylene chloride. The complete solubility of the tan solid indicated that no free aluminum chloride was formed by loss of sulfur dioxide during evaporation of the solvent.

The methylene chloride solution was evaporated again and the residue treated at room temperature at about two torrs for three hours. When methylene chloride was added to this residue, nearly all of the residue went into solution. The suspended solid was allowed to settle; the supernatant liquid was siphoned off and saved. The solid was identified as free aluminum chloride. The amount recovered corresponded to about 4 percent of the starting aluminum chloride.

The supernatant liquid which was siphoned off was evaporated. The resultant residue was heated at 40–45° C. for four hours at two torrs. A white solid sublimed on the colder parts of the reaction vessel. The material at the bottom of the reaction vessel became opaque and very viscous. The solid obtained by this treatment was completely soluble in nitrobenzene and indicated that 39 percent of the starting aluminum chloride was recovered.

This aluminum chloride is suitable for recycling in any chemical process, say, a subsequent carbonylation of an additional amount of 1,2-dichloropropane.

Having fully described this invention and its many utilities it is desired that the invention only be limited by the lawful scope of the appended claims.

I claim:

1. A process for the isolation of β-chloroisobutyryl chloride, said process comprising reacting sulfur dioxide with a β-chloroisobutyryl chloride-aluminum halide complex, whereby said complex is disrupted to form said acyl halide and a resultant complex between said aluminum halide and sulfur dioxide.

2. The process of claim 1 being conducted in the presence of solvent quantities of methylene chloride or carbon tetrachloride.

3. The process of claim 1 being conducted at a temperature within the range of from about −30° C. to 45° C.

4. The process of claim 1 being further characterized in that after said acyl halide and resultant complex are formed and said acyl halide is removed from the reaction mixture, said resultant complex is subsequently heated to a temperature within the range of from about 30° C. to about 50° C. under a pressure within the range of from about 1 to 10 torrs whereby aluminum halide is recovered from said resultant complex.

References Cited

Cook, Spectroscopic Investigations, Friedel-Crafts and Related Reactions, vol. 7, pp. 790–795.

LORRAINE A. WEINBERGER, *Primary Examiner.*

J. H. NIELSEN, *Assistant Examiner.*

U.S. Cl. X.R.

23—96